(12) United States Patent
Briancourt et al.

(10) Patent No.: US 10,214,278 B2
(45) Date of Patent: Feb. 26, 2019

(54) AIRCRAFT COMPRISING A FOLDABLE AERODYNAMIC STRUCTURE AND AN ARTICULATION MECHANISM FOR A FOLDABLE AERODYNAMIC STRUCTURE

(71) Applicant: AIRBUS OPERATIONS LIMITED, Bristol (GB)

(72) Inventors: Stephen Paul Briancourt, Bristol (GB); Sylvain Boye, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 342 days.

(21) Appl. No.: 15/064,160

(22) Filed: Mar. 8, 2016

(65) Prior Publication Data

US 2016/0264232 A1 Sep. 15, 2016

(30) Foreign Application Priority Data

Mar. 9, 2015 (GB) .................................. 1503980.3

(51) Int. Cl.
*B64C 3/56* (2006.01)
*B64C 23/06* (2006.01)

(52) U.S. Cl.
CPC .............. *B64C 3/56* (2013.01); *B64C 23/072* (2017.05); *Y02T 50/164* (2013.01)

(58) Field of Classification Search
CPC ........ B64C 3/56; B64C 23/072; Y02T 50/164
See application file for complete search history.

(56) References Cited

U.S. PATENT DOCUMENTS

| 5,201,479 | A | * | 4/1993 | Renzelmann | ............. | B64C 3/56 |
| | | | | | | 244/49 |
| 5,427,329 | A | | 6/1995 | Renzelmann et al. | | |
| 9,950,780 | B2 | * | 4/2018 | Santini | ...................... | B64C 3/56 |
| 2012/0228424 | A1 | | 9/2012 | Parker | | |
| 2013/0001367 | A1 | | 1/2013 | Boer et al. | | |
| 2013/0292508 | A1 | | 11/2013 | Fox | | |

(Continued)

FOREIGN PATENT DOCUMENTS

| EP | 2727830 A2 | 5/2014 |
| WO | 2011051699 A2 | 5/2011 |

OTHER PUBLICATIONS

UKIPO Search Report dated Sep. 11, 2015, Great Britain Application No. 1503980.3.

(Continued)

*Primary Examiner* — Valentina Xavier
(74) *Attorney, Agent, or Firm* — Nixon & Vanderhye P.C.

(57) ABSTRACT

An aircraft, for example a passenger aircraft, comprises a foldable wing having an inner region and an outer region. The outer region is moveable relative to the inner region between a flight configuration, an intermediate configuration, and a ground configuration. In the flight configuration the inner and outer regions are locked together via a multiplicity of connectors for transferring loads. In the intermediate configuration the outer region is displaced, for example forwardly, such that the connection is disengaged to unlock the outer region from the inner region. In the intermediate configuration the outer region is also connected to the inner region via a hinge. In the ground configuration, the outer region is rotated about the hinge, such that the span of the wing is reduced.

19 Claims, 8 Drawing Sheets

(56) References Cited

U.S. PATENT DOCUMENTS

| | | | |
|---|---|---|---|
| 2013/0313356 A1 | 11/2013 | Santini et al. | |
| 2014/0061371 A1 | 3/2014 | Good et al. | |
| 2014/0117150 A1* | 5/2014 | Good | B64C 3/56 244/49 |
| 2014/0117151 A1* | 5/2014 | Fox | B64C 23/072 244/49 |
| 2015/0203190 A1* | 7/2015 | Witte | B64C 23/069 244/199.4 |
| 2015/0336657 A1* | 11/2015 | Townsend | B64C 3/56 244/49 |
| 2016/0090170 A1* | 3/2016 | Thompson | B64D 45/0005 701/3 |
| 2016/0244146 A1* | 8/2016 | Harding | B64C 3/56 |
| 2017/0021911 A1* | 1/2017 | Wildschek | B64C 3/38 |

OTHER PUBLICATIONS

European Search Report dated Jul. 4, 2016 EP Application No. 16158409.

\* cited by examiner

AIRCRAFT COMPRISING A FOLDABLE AERODYNAMIC STRUCTURE AND AN ARTICULATION MECHANISM FOR A FOLDABLE AERODYNAMIC STRUCTURE

RELATED APPLICATIONS

The present application claims priority from Great Britain Application No. 1503980.3, filed Mar. 9, 2015, the disclosure of which is hereby incorporated by reference herein in its entirety.

BACKGROUND OF THE INVENTION

The present invention relates to an aircraft comprising a foldable aerodynamic structure, an articulation mechanism for said structure, and to a method of folding an aerodynamic structure.

There is a trend towards increasingly large passenger aircraft with higher performance efficiency (for example fuel burn reduction), for which it is desirable to have correspondingly large wing spans. However, the maximum aircraft span is effectively limited by airport operating rules which govern various clearances required when maneuvering around the airport (such as the span and/or ground clearance required for gate entry and safe taxiway usage). Large aircraft may also give rise to other problems as a result of their size. For example, the entrance/exit of existing infrastructure such as aircraft hangers, may be too small to allow passage of the aircraft, and may need to be modified.

In some known aircraft designs (typically military aircraft) each of the aircraft's wings comprises an outer region which may be folded about a generally chordwise hinge line, between a flight configuration and a ground configuration. Such arrangements may enable the aircraft to occupy a relatively small space when on the ground, but to still have a relatively large wing span for flight. The movement of the outer region about the hinge is typically effected by an actuator. In some designs, this actuator may be locked, or have a dedicated lock actuator(s) which effects a lock in order to hold the outer region in place. However, such a design requires the lock to be safe-life (i.e. a component that cannot fail). Some alternative designs comprise multiple locks to lock the outer region in place in the flight configuration. This has the advantage that there are multiple load transfer paths between the outer and inner regions, such that each lock can be fail-safe (i.e. failure of one or more locks would not be catastrophic as there is redundancy provided by the other locks). However, a design that uses a dedicated lock actuator(s) to lock/unlock the locks is relatively complex (both in terms of the number and weight of actuators, and the control/sensor arrangements needed to coordinate the folding of the wing).

The present invention seeks to mitigate at least some of the above-mentioned problems.

SUMMARY OF THE INVENTION

According to a first aspect of the invention, there is provided an aircraft comprising a foldable aerodynamic structure, the aerodynamic structure comprising an inner region and an outer region, the outer region being moveable relative to the inner region between: a flight configuration for use during flight, an intermediate configuration, and a ground configuration for use during ground-based operations. In the flight configuration the inner and outer regions are locked together via a multiplicity of connectors, the connectors being arranged to transfer loads from the outer region to the inner region; in the intermediate configuration the outer region is displaced in a first direction, relative to the inner region, the displacement being such that the connection by the multiplicity of connectors is disengaged and being such that the outer region is unlocked from the inner region, and in the intermediate configuration the outer region also being connected to the inner region via a hinge about which the outer region may rotate, and in the ground configuration, the outer region is rotated about the hinge, such that the span of the aerodynamic structure is reduced.

By providing an arrangement in which the outer region is displaced from the flight configuration (in which the inner and outer regions are locked together via the multiplicity of connectors) into the intermediate configuration (in which the connection by the multiplicity of connectors is disengaged, and the outer region is unlocked from the inner region), the present invention enables there to be a multiplicity of load transfer paths in the flight configuration (thereby ensuring the structure is fail-safe), but does not necessarily require dedicated actuators to lock/unlock each connector because that lock/unlock function can be achieved b the displacement.

The aircraft may comprise an actuator, the actuator being arranged to effect the movement of the outer region between the flight configuration and the intermediate configuration. The actuator may also be arranged to effect movement of the outer region between the intermediate configuration and the ground configuration. Thus, embodiments of the present invention preferably enable the same, single, actuator to be used to both move the structure between flight and ground configurations, and to lock/unlock the connectors. Such an arrangement is relatively simple, especially compared to the complex arrangements of the prior art in which there are dedicated lock actuators. Minimising the number of actuators also tends to increase the reliability of the arrangement as a whole.

The displacement is preferably a translational movement. The first direction is preferably forward. The first direction is preferably generally chordwise. Such an arrangement is preferable because aerodynamic drag forces (generally acting rearwardly) will urge the outer region back into the flight configuration in the event of an equipment failure.

Each connector is preferably arranged to allow movement of the outer region in the first direction. Each connector may be arranged to prevent movement of the outer region in a direction perpendicular to the first direction. For example, each connector may be arranged to prevent movement in a spanwise direction. The multiplicity of connectors are preferably located off the hinge line such that, in the flight configuration, they prevent relative rotation between the inner and outer regions. For example, the multiplicity of connectors may be located around the perimeter of a cutplane in the aerodynamic structure that separates the inner and outer regions.

The connectors are preferably fail-safe. Thus, if at least one connector fails, the remaining connectors may still be suitable for safely transferring loads from the outer to the inner regions of the structure.

Each connector may comprise a pin associated with the inner or outer region, and a socket associated with the corresponding other (outer or inner) region. Each pin may be engaged in the respective socket when the outer region is in the flight configuration. The pins may be aligned with the first direction to allow movement of the outer region between the flight and intermediate configurations.

It will be appreciated that each connector in isolation need not necessarily form a lock, but that the multiplicity of connectors may together lock the inner and outer regions together. In the flight configuration, the inner and outer regions are locked together. When locked together, the connectors are preferably arranged to prevent relative rotation between the inner and outer regions.

The aircraft may comprise a permanent hinge between the inner and outer regions. More preferably however, in the flight configuration the outer region is connected to the inner region via a further connector arranged to transfer loads from the outer region to the inner region, and the further connector is arranged such that when the outer region is displaced in the first direction, relative to the inner region, the further connector becomes the hinge. Such an arrangement thus facilitates an additional load path in the flight configuration, yet also provides a means by which the outer region can rotate when required (i.e. in the intermediate configuration).

The aircraft may comprise an articulation mechanism operable to effect movement of the outer region between the flight, intermediate and ground configurations. The articulation mechanism is preferably operable by the actuator.

The articulation mechanism preferably comprises a link and a pivotable crank. The link may be connected at its first end to the crank. The link may be connected at its second end to either the inner or the outer region. The crank may be being pivotally connected to the other of the outer and inner regions.

The link is preferably of fixed length.

In the flight configuration, the connections between the inner/outer region and link, the link and crank, and the crank and outer/inner region, may be substantially in line. Such an arrangement may thereby form a geometric lock. In embodiments comprising an actuator for effecting movement from the flight to intermediate configurations, the actuator may be arranged to effect rotation of the crank to make, and break, the geometric lock. The said geometric lock may also be sustained by action of a resilient biasing means (for example a spring) in the absence of the actuator.

The articulation mechanism may be arranged such that rotation of the crank through a first angular displacement from its location in the flight configuration, displaces the outer region in the first direction such that the outer region is in the intermediate configuration. After rotation by the first angular displacement, the crank may be prevented from further rotational movement by a stop thereby preventing further displacement of the outer region in the first direction. Further movement of the actuation of the actuator results in rotation about said hinge line. The first end of the link may be located on the hinge line, such that during rotation no further movement in the first direction is imparted.

When the outer region is moving between the ground configuration and the intermediate configuration, the aircraft is preferably arranged to prevent translational movement in the reverse of the first direction (for example, the hinge may comprise a baulk feature to prevent such movement). Such a feature is beneficial because it ensures that translational movement (which may otherwise have re-engaged the connection by the multiplicity of connectors) does not occur when the parts for forming the connections are unaligned (for example as the wing is being folded).

The aircraft may comprise a pair of locking arms for locking the outer region in the ground configuration. In the flight configuration the locking arms may be stowed. In the ground configuration the locking arms may be deployed such that they form a locking brace to lock the outer region in the ground configuration. The locking arms may be pivotably connected together at one end. The locking arms may be pivotably connected at their respective other ends to the inner and outer regions respectively. The aircraft may be arranged such that in the flight configuration the pair of locking arms are folded together, and in the ground configuration the locking arms are unfolded such that the arms form the locking brace.

When the locking arms are unfolded to form a brace, they may be held in the brace position by a holding member (for example by an additional link). The holding member may be deployed (directly or indirectly) by the actuator. The locking arms forming the brace may be unlocked (folded) by reverse movement of the holding member.

In principle, the invention may be applicable to a number of different aerodynamic structures. More preferably, however, the aerodynamic structure is an aerofoil structure. In some embodiments, the structure may be the fin of a tail-plane (the 'span' in this context being understood to be the height of the fin, such that in the ground configuration the height of the aircraft is reduced). Such an arrangement may be beneficial to enable access into/out of hangers for which the existing opening is too low. In other embodiments, aerodynamic structure may be a wing. The outer region may be part of the main wing structure. More preferably, the outer region comprises, and more preferably is, a wing tip device (for example a winglet, fence or planar extension). In the flight configuration the trailing edge of the outer region is preferably a continuation of the trailing edge of the inner region. The leading edge of the outer region is preferably a continuation of the leading edge of the inner region, such that there is a smooth transition from the inner to the outer region. It will be appreciated that there may be a smooth transition, even where there are changes in sweep or twist at the junction between the inner and outer regions. However, there are preferably no discontinuities at the junction between the inner and outer regions. The upper and the lower surfaces of the outer region may be continuations of the upper and lower surfaces of the inner region.

In the flight configuration, the span of the aircraft may exceed an airport compatibility gate limit. In the ground configuration the span of the aircraft is preferably reduced such that the span (with the wing tip device in the ground configuration is less than, or substantially equal to, the airport compatibility gate limit.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers.

According to another aspect of the invention, there is provided an aircraft comprising a foldable wing, the wing comprising an inner region and an outer region, the outer region being moveable relative to the inner region between: a flight configuration for use during flight, an intermediate configuration, and a ground configuration for use during ground-based operations. In the flight configuration the inner and outer regions are preferably locked together via a multiplicity of pin-and-socket connectors located around the perimeter of the wing in a generally vertical cut-plane, such that the connectors prevent relative rotation between the inner and outer regions and transfer loads from the outer to the inner region of the wing. The pin and socket of each connector may be aligned in a generally chordwise direction such that translation movement in the chordwise direction is enabled. In the intermediate configuration, the outer region may be displaced in the chordwise direction, relative to the inner region, the displacement being such that the connection by the multiplicity of connectors is disengaged and being such that the outer region is unlocked from the inner region. The displacement in the chordwise direction may be effected by an actuator acting on an articulation mechanism. In at least the intermediate configuration, the outer region is also connected to the inner region via a hinge about which the outer region may rotate. In the ground configuration, the outer region is rotated about the hinge, such that the span of the aerodynamic structure is reduced. The rotation is preferably effected by the actuator further acting on the articulation mechanism.

In the flight configuration, the span of the aircraft may exceed an airport compatibility gate limit. In the ground configuration the span of the aircraft is preferably reduced such that the span (with the wing tip device in the ground configuration) is less than, or substantially equal to, the airport compatibility gate limit.

According to another aspect of the invention, there is provided a foldable aerodynamic structure for use as the foldable aerodynamic structure described herein.

According to yet another aspect of the invention, there is provided an articulation mechanism for use as the articulation mechanism described herein.

According to another aspect of the invention, there is provided a method of folding an aerodynamic structure on an aircraft from a flight configuration to a ground configuration, in which flight configuration an inner region of the aerodynamic structure and an outer region of the aerodynamic structure are locked together via a multiplicity of connectors, the connectors being arranged to transfer loads from the outer region to the inner region wherein the method comprises the steps of displacing the outer region of the structure in a first direction, relative to the inner region, such that the connection by the multiplicity of connectors is disengaged thereby unlocking the outer region from the inner region, and subsequently rotating the outer region about a hinge such that the span of the aerodynamic structure is reduced.

The step of displacing the outer region in the first direction may be effected by an actuator. The step of rotating the outer region about the hinge may be effected by the same actuator.

The method may include the step of locking the outer region in the ground configuration. The step of locking the outer region in the ground configuration may be effected by the same actuator as used to displace the outer region, and/or rotate the outer region about the hinge.

There may also be provided a method of unfolding the aerodynamic structure from the ground configuration to the flight configuration. The method may comprise the reverse of the steps described above.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1A:
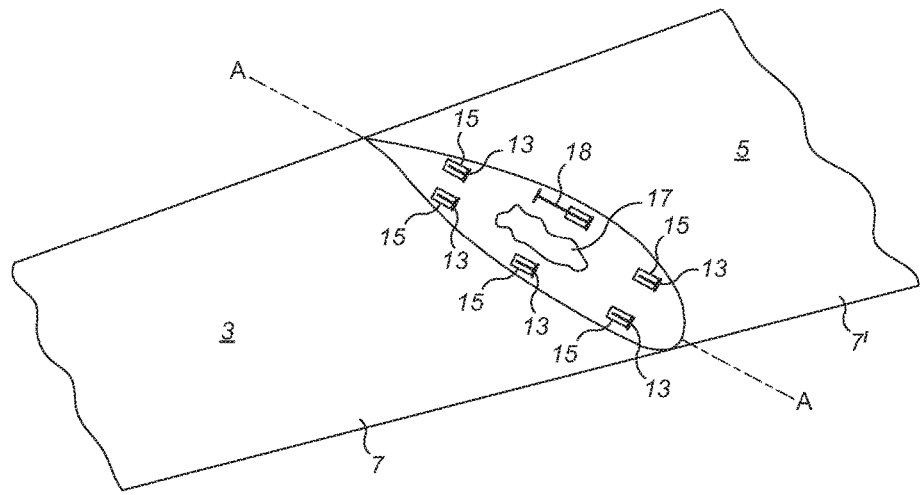
FIG. 1a to 1c are schematic drawings showing a wing on an aircraft according to a first embodiment of the invention, the outer region of the wing being shown in the flight, intermediate and ground configurations respectively.
Figure 1B:
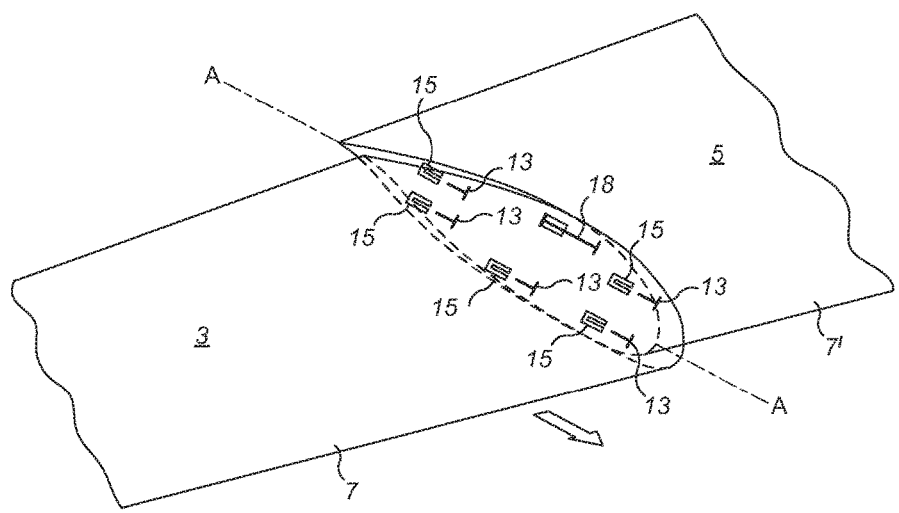
Figure 1C:
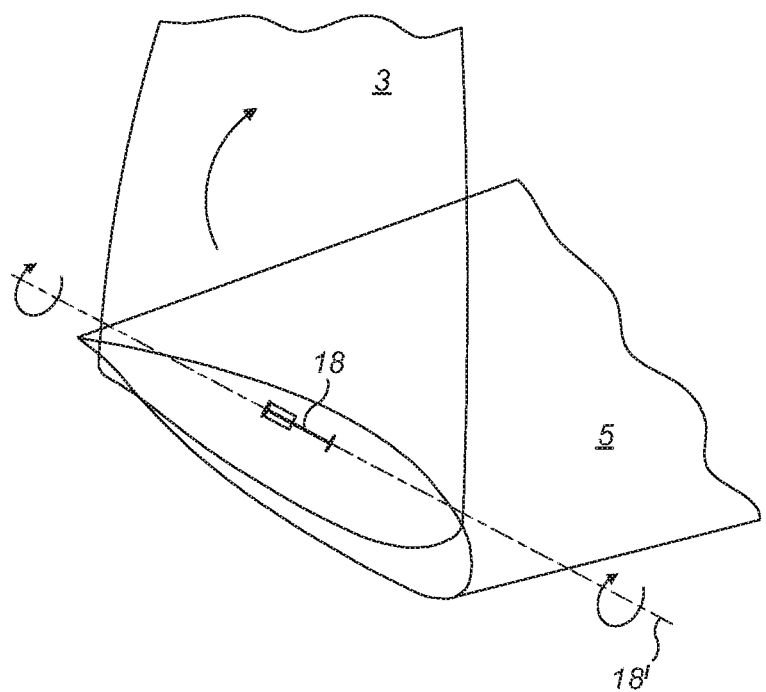
Figure 8:
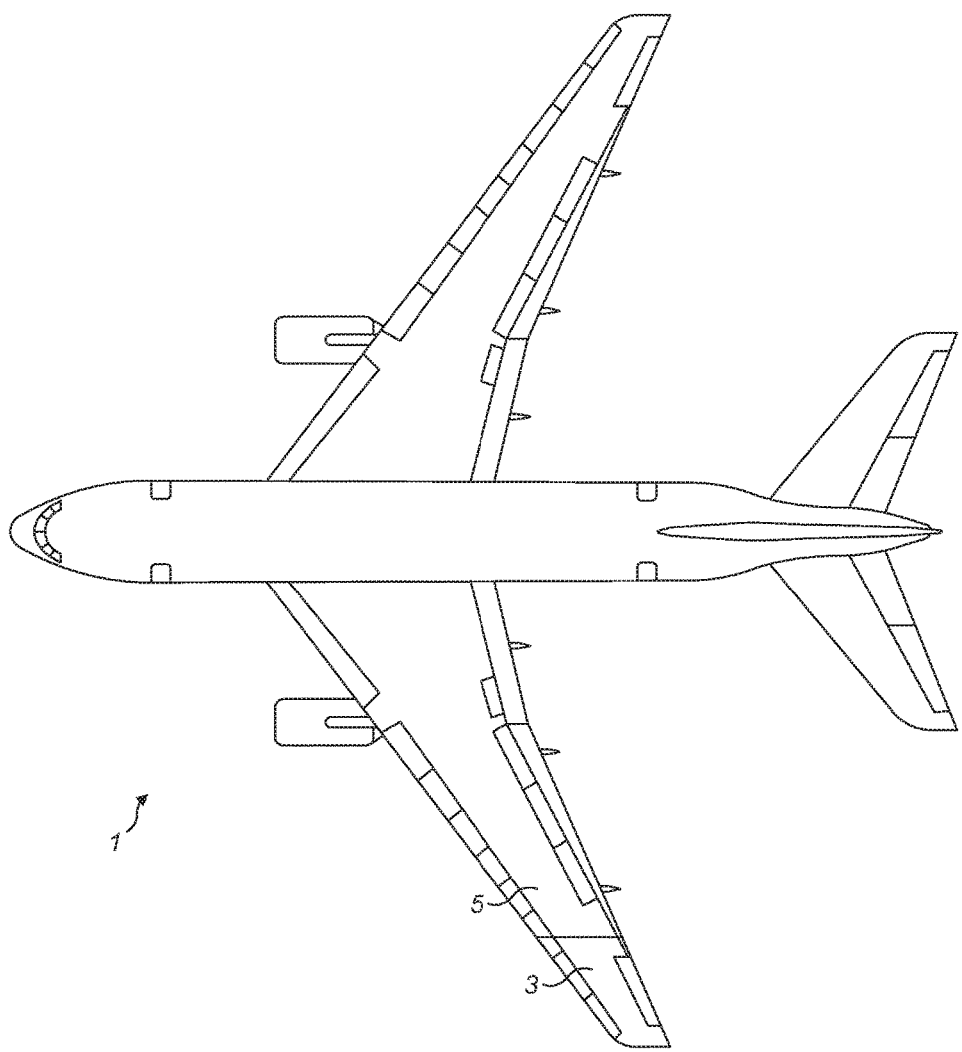
FIG. 8 is a plan view of the aircraft of the first embodiment of the invention.

FIGS. 1a to 1c are schematic drawings showing a wing on an aircraft 1 (see FIG. 8) according to a first embodiment of the invention. The wing comprises an outer region 3 and an inner region 5.

In FIG. 1a the outer region of the wing is shown in a flight configuration for use during flight. In this configuration, the outer region 3 is effectively an extension of the inner region 5 such that the leading and trailing edges 7, 9 of the outer region 3 are continuations of the leading and trailing edges 7', 9' of the inner region 5, and the upper and lower surfaces of the outer region 3 are continuations of the upper and lower surfaces of the inner region 5. In the first embodiment of the invention the inner and outer regions together form a main wing on the aircraft 1. In other embodiments, the outer region may, for example, be a wing tip device such as a winglet.

FIG. 1a shows a section through the wing along a cut-plane A-A separating the inner and outer regions 5, 3. A series of connectors 11 are arranged around the perimeter of the aerofoil section. Each connector (shown in more detail in subsequent figures) comprises a pin 13 and a corresponding socket 15. The pins 13 are fixedly coupled to the inner-most rib of the outer region 3 of the wing, whereas the sockets 15 are fixedly coupled to the outer-most rib of the inner region 5. In the flight configuration, shown in FIG. 1a, each of the pins 13 is engaged in a respective socket 15. Since the connectors are positioned around the perimeter of the aerofoil (and more particularly they are positioned off a common hinge axis) the inner 5 and outer 3 regions of the wing are thereby locked together so as to prevent relative rotation, and to prevent relative vertical movement, between the two regions. Relative movement in a forwards direction (generally chordwise) is prevented by a geometric lock in the actuation mechanism 17 (shown schematically within a wavy line in FIG. 1a). That geometric lock and articulation mechanism is described in more detail below with reference to FIGS. 2a and 2b.

Referring now to FIG. 1b, in the first embodiment of the invention, the outer region 3 of the wing is moveable to an intermediate configuration in which it is translated forwards in a generally chordwise direction (shown by the large arrow in FIG. 1b). This displacement is such that the pin 13 of each connector disengages its respective socket 15, thereby unlocking the outer region 3 from the inner region 5.

Figure 5:
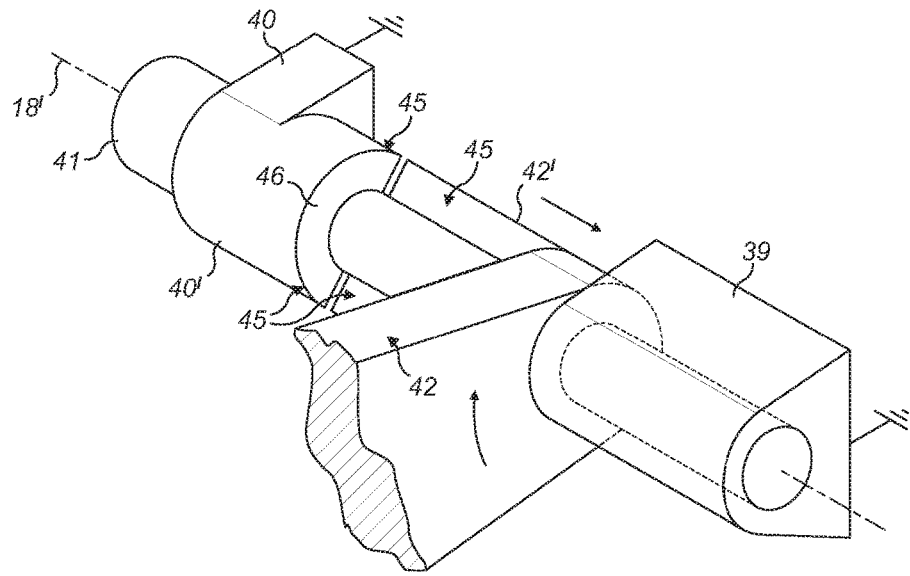
FIG. 5 is a perspective view of the hinge created when the outer region is in the intermediate configuration.

When the outer region is in this intermediate configuration, a hinge 18 is created (the specific hinge arrangement is described in more detail with reference to FIG. 5 below). Since the outer region 3 is unlocked from the inner region 5, it is free to rotate about said hinge 18 (having a hinge line 18' indicated by a dashed line), to the ground configuration shown in FIG. 1c. In this ground configuration, the outer region 3 is rotated upwardly about the hinge (see arrows in FIG. 1c) so as to reduce the span of the wing.

For performance efficiency, it is desirable to have a large wing span. However, airport operating rules, which govern various clearances required when maneuvering around the airport (such as the span and/or ground clearance required for gate entry and safe taxiway usage), restrict the maximum span allowable on the ground. Thus, having a foldable wing is beneficial because it enables the aircraft to have a large span during flight, whilst still enabling it to comply with the airport operating rules. In some known folding wing designs, an actuator may be locked, or have a dedicated lock actuator(s) which effects a lock in order to hold the outer region in place. However, such a design requires the lock to be safe-life (i.e. a component that cannot fail). Some alternative designs comprise multiple locks to lock the outer region in place in the flight configuration. This has the advantage that there are multiple load transfer paths between the outer and inner regions, such that each lock can be fail-safe (i.e. failure of the lock would not be catastrophic as there is redundancy provided by the other locks). However, a design that uses a dedicated lock actuator(s) to lock/unlock the locks is relatively complex (both in terms of the number and weight of actuators, and the control/sensor arrangements needed to coordinate the folding of the wing).

The first embodiment of the present invention provides a fail-safe arrangement because there are a multiplicity of connectors 13, 15 for transferring loads from the outer to inner regions 3, 5 in the flight configuration. However, by providing an arrangement in which the outer region 3 is displaced from the flight configuration into the intermediate configuration (in which the outer region is unlocked from the inner region), there is no need for a dedicated actuator(s) to lock/unlock each or all connector(s); that lock/unlock function can be achieved by the displacement instead, and that displacement is effected by a single actuator. Such an arrangement is relatively simple, especially compared to the relatively complex arrangements of the prior art, in which there are dedicated lock/unlock actuators.

Furthermore, the first embodiment of the invention is especially safe because when the outer region is in the flight configuration, aerodynamic drag forces (generally acting rearwardly) will act to maintain the outer region 3 in the flight configuration. Thus, in the event of an unexpected equipment failure (for example failure of the actuator or mechanism), the outer region will be unable to move from the (locked) flight configuration.

As mentioned above, with reference to FIG. 1a, the aircraft comprises an articulation mechanism 17 and an actuator for effecting movement of the outer region 3 of the wing. The articulation mechanism and actuator will now be described in more detail with reference to FIGS. 2a to 5.

Figure 2A:
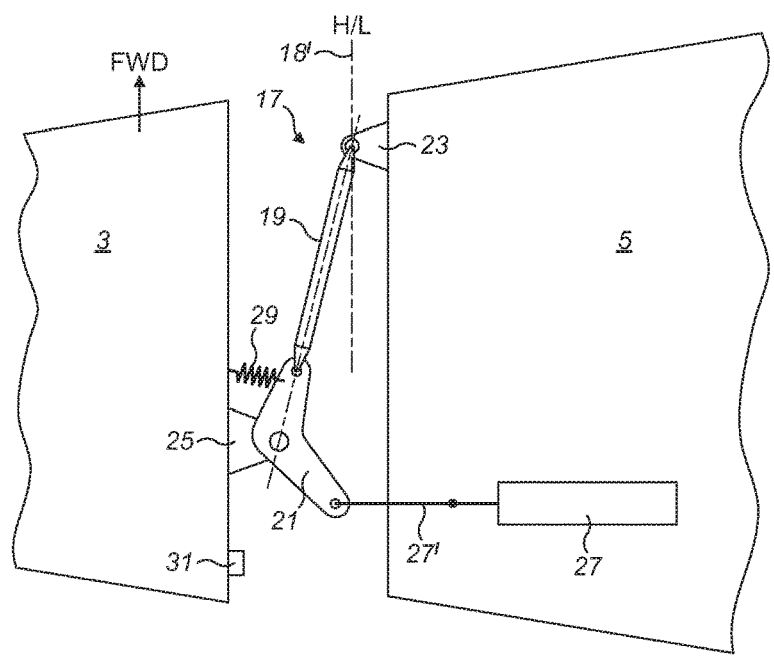
FIGS. 2a and 2b are plan views of the wing of FIGS. 1a and 1b respectively.
Figure 2B:
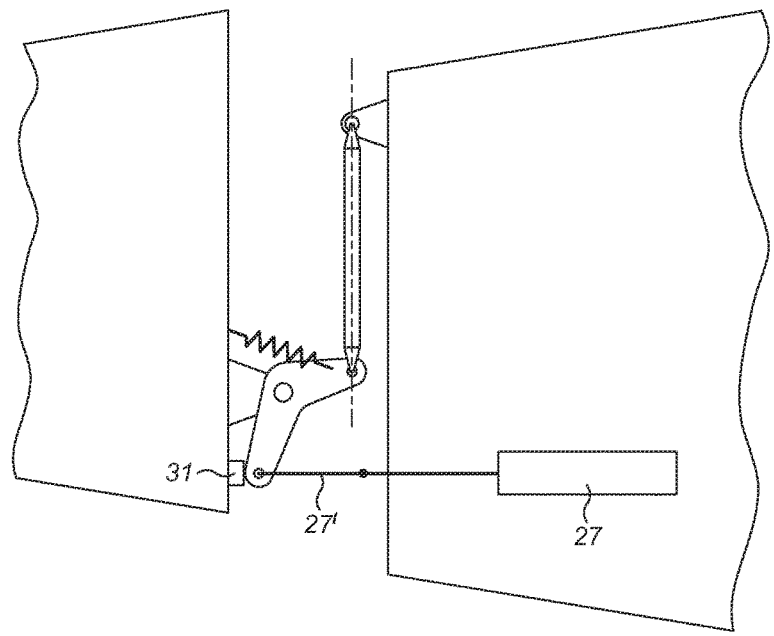

FIGS. 2a and 2b are plan views of the inner and outer regions showing some selected parts of the articulation mechanism 17. The wing skin in the region of the junction between the two regions is removed for clarity, and the connectors, and some other parts of the mechanism are also not shown for the sake of clarity.

The articulation mechanism comprises a rigid link 19 and a bell crank 21. The link 19 is pivotally connected at one end to forward arm of the bellcrank 21, and pivotally connected at the other end (at a spherical bearing) to a fixed mounting 23 on the inner region 5 of the wing. The bellcrank is pivotally mounted on a fixed mounting 25 on the outer region 3. The axis of rotation of the bellcrank 21 is substantially vertical (i.e. parallel to the thickness of the wing). The rearward arm of the bellcrank 21 is connected to a linear actuator 27.

In the flight configuration, the connection between the inner region 5 and the link 19, the connection between the link 19 and the forward arm of the bellcrank 21, and the connection between the bellcrank 21 and the outer region 3 are substantially all inline. This forms a geometric lock that prevents relative translational movement of the inner and outer regions, thereby holding the pins of the connectors (not shown in FIGS. 2a-2b) firmly engaged in their respective sockets (also not shown in FIGS. 2a-2b). A spring 29 attached between the bellcrank 21 and outer region 3 holds this geometric lock against a stop (not shown).

The actuator 27 is arranged to make/break the geometric lock my pulling/pushing on the rearward arm of the bellcrank 21, and is also arranged to effect movement of the outer region into the intermediate configuration. The actuator comprises an extendable arm 27, and fixed link 27' articulated on the end of that arm 27. As shown in FIG. 2b, when the actuator arm 27 is extended, pushing on the rearward arm of the bellcrank 21, the bellcrank 21 is forced to rotate. This action drags the outer region 3 forwards because the forward connection between the link 19 and inner region 5 (at the lug 23) prevents aft movement of the forward bellcrank arm. This action slides the outer region forward until all the pins of the connectors are disengaged from their respective sockets (i.e. to the intermediate configuration described above with reference to FIG. 1b).

A stop 31 on the outer region limits the rotation of the bellcrank 21, and thus limits the translational movement of the outer region. The stop 31 is positioned such that when the bellcrank 21 reaches the stop 31, the outer region 3 has been translated forward to a position in which the pins 13 are clear of the sockets 15. At this point, the outer region 3 is free to rotate about the hinge 18. Further extension of the actuator 27 effects this rotation, forcing the outer region 3 to swing upwards. No additional translational motion is imparted to the outer region because the forward end of the link 19 is located on the hinge line 18'. Therefore, the link 19 also simply rotates about the hinge line 18', whilst its aft end (at which it connects to the bellcrank 21) moves with the outer region 3 as it swings upwards.

Figure 3:
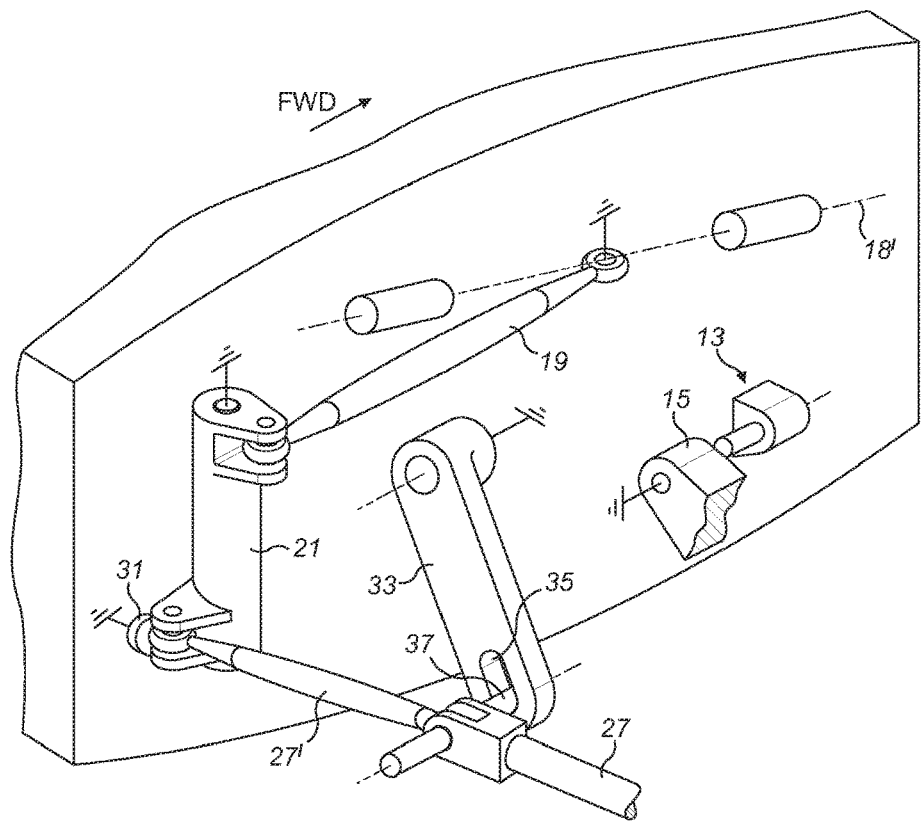
FIG. 3 is a perspective view the wing of FIGS. 1b and 2b.
Figure 4:
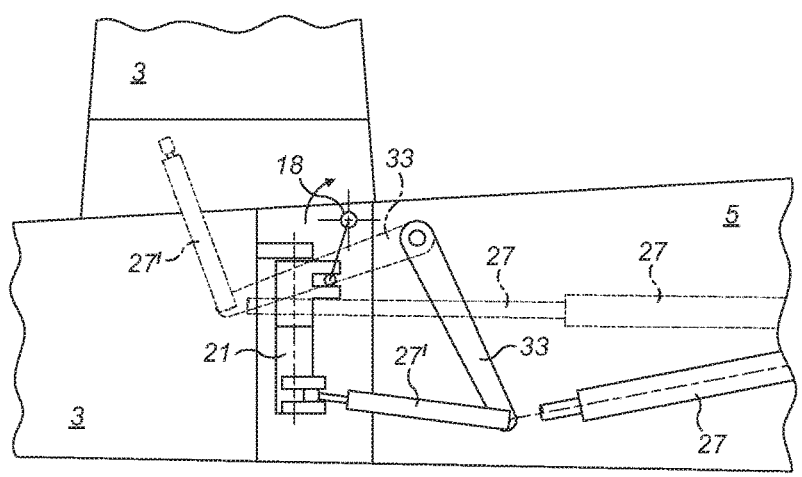
FIG. 4 is frontal view the wing of FIG. 3, but also showing the wing in the ground configuration.

FIG. 3 shows the arrangement of FIG. 2b, but in perspective view. FIG. 3 also shows a locus control arm 33, which is arranged to swing about a connection on the inner region 5. The locus control arm has a slot 35 into which a finger 37 on the end of the actuator arm 27 is located. As the actuator arm 27 extends, the locus control arm 33 guides the movement of the end of the actuator arm through an arc. The locus control arm 33 also allows the fixed link 27' to push the wing tip through a larger displacement angle than that of the actuator. This is illustrated in FIG. 4, which shows the outer region in the flight and ground configurations, and the corresponding positions of the actuator 27, link 27' and locus control arm 33 in these configurations.

As mentioned above, the outer region rotates about hinge 18 to reach the ground configuration. The hinge 18 is shown in more detail in FIG. 5. Although only one hinge is shown, there may also be a second hinge (located along the hinge line 18'), for example to prevent twisting of the outer region when folding.

The hinge 18 comprises brackets 39 and 40 fixed to the inner region 5 of the wing, a pin 41, and a lug 42 fixed to the outer region 3. The pin 41 passes through the supporting brackets 39, 40 and through the lug 42. The bracket 40 comprises a forward protruding portion 40' shaped like half a cylinder wrapped around the pin. The lug 42 also has such a feature 42', protruding aft, which is a mating half to the corresponding feature 40' seen on the bracket 40.

In the flight configuration, the bracket 40 and the lug 42 are in a coupled arrangement in which the axial faces 45 of each protruding portion 40', 42' abut one another such that relative rotation is prevented (the bracket 40 being fixed to the inner region of the wing). However, the lug 42 is slideable along the pin (and relative to the brackets 39, 40). In the intermediate configuration (in which the outer region is displaced forwards), the lug 42 is translated forwards and the brackets 39, 40, and lug 42 can independently rotate about the pin 41 (and thus the hinge line 18'). The hinge in FIG. 5 is shown when the outer region is in the intermediate configuration and the two parts 40' and 42' are uncoupled from one another. Once the two parts are uncoupled, and there has been relative rotation between the two parts (the latter not shown in FIG. 5), the parts are unable to translate back to their coupled arrangement because the axial faces 45 are no longer aligned. The end faces of the protruding 'half cylinders' on the bracket 40 and lug 42, which form two radial faces (only one of which (46) is visible in FIG. 5) thus from a 'baulk' feature that prevents rearward translation of the outer region, once it is in, or is rotating towards, the ground configuration. This is important because if the folding of the wing towards the ground configuration were halted and reversed part way into the fold, the actuator would (without this baulk feature) tend to pull the bellcrank off the stop, which would then cause the tip to translate aft. If it did translate aft, it would be in the wrong position to allow engagement of the pins into the sockets.

It will be appreciated that when the parts 40' and 42' are coupled (which is the case when the outer region is in the flight configuration), the hinge components actually act as a further connector. However, when the outer region is in the intermediate configuration, the parts are uncoupled, and relative rotation about the hinge line 18' is enabled, such that the hinge component functions as a hinge. In other embodiments of the invention (not shown), the hinge is permanently present and need not necessarily be created when the outer region is in the intermediate configuration.

Figure 6:
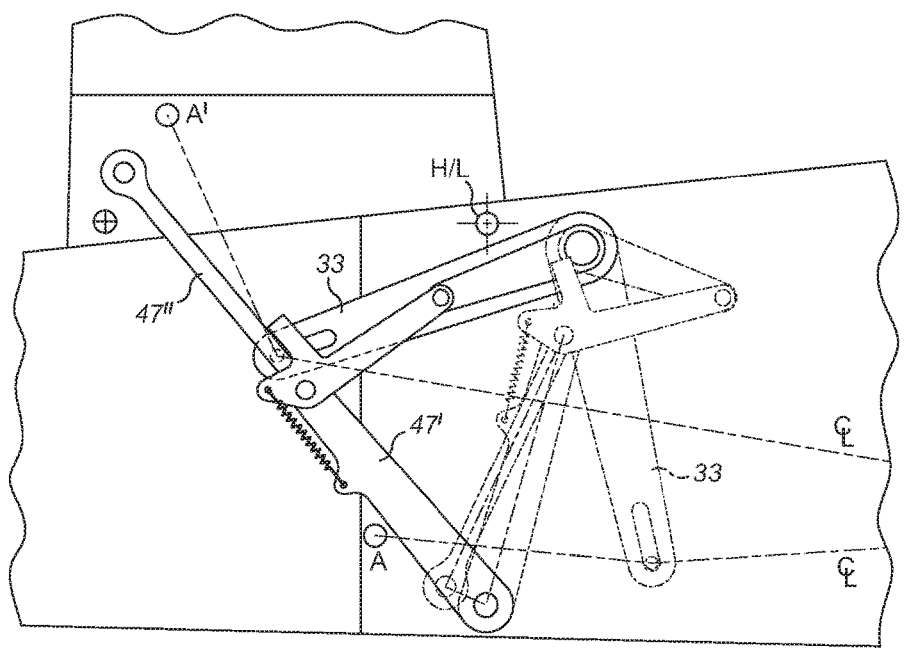
FIG. 6 is a frontal view of a locking mechanism for the wing in the aircraft of the first embodiment of the invention.
Figure 7:
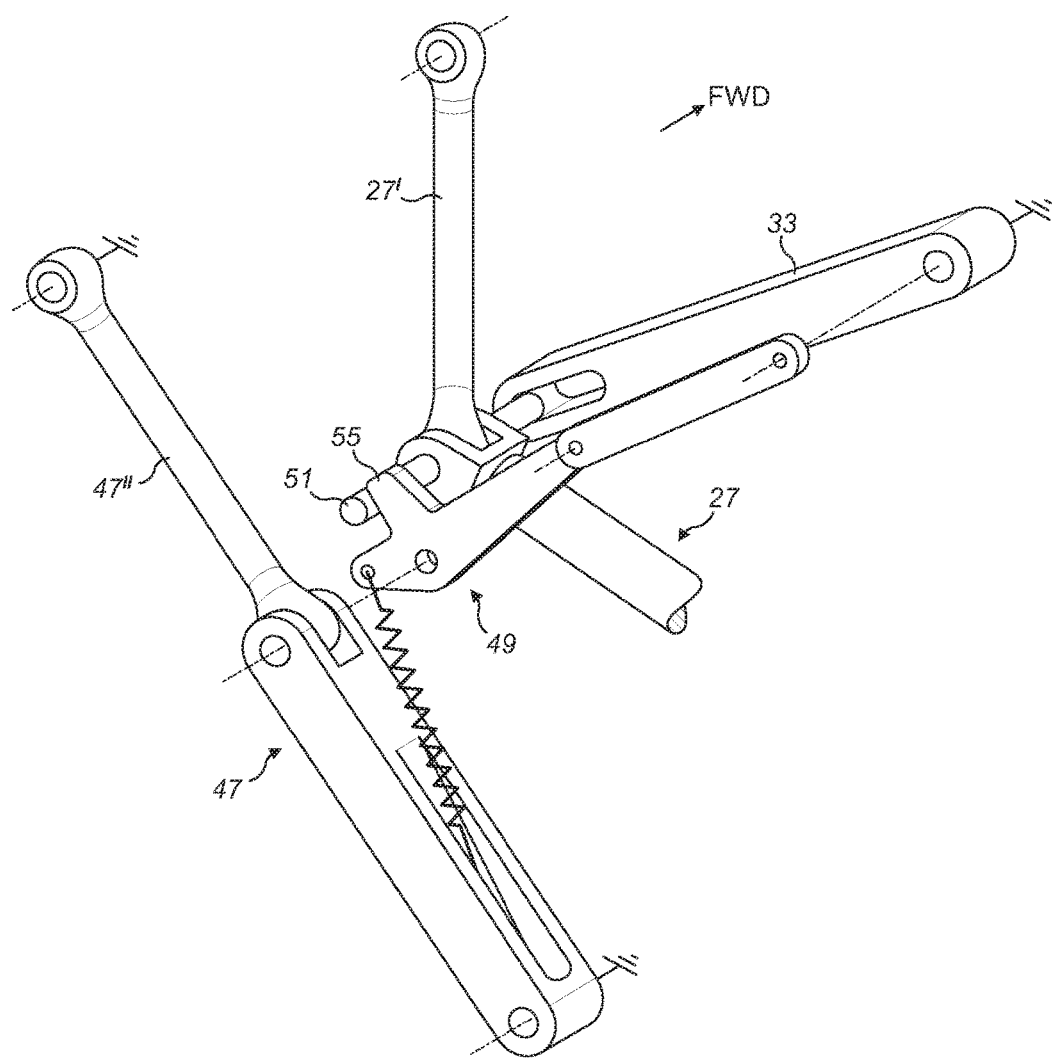
FIG. 7 is a perspective view of the arrangement of FIG. 6.

The aircraft of the first embodiment of the invention also comprises a pair of locking arms 47. These locking arms are described with reference to FIGS. 6 and 7. In the flight configuration the locking arms are stowed (folded together), but in the ground configuration the locking arms 47 are deployed such that they form a locking brace to lock the outer region 3 in the ground configuration.

The pair of locking arms 47 comprises a first arm 47' connected at one end to the inner region. 5, a second arm 47" connected at one end to the outer region. 5, and the two arms being connected together at a pivoting joint. During the swinging motion as the outer region moves from the intermediate configuration to the ground configuration, the pair of arms 47 unfold towards a position in which the arms 47' and 47" are inline. A further pair of lock links 49, connected at one end to the centre joint of the pair of locking arms 47 and at the other end to the inner region 5 also unfold. As the outer region of the wing approaches the ground configuration, the lock links 49 are pulled slightly overcentre onto a stop (not shown) by a spring 53. At this point the pair of locking arms 47 are in a straight line forming a geometric lock. The pair of locking arms thus act as a brace and hold the outer region in the ground configuration. The arms are able to react loads without causing the lock links to unfold, and further extending movement of the actuator 27 is prevented.

To return the outer region into the flight configuration, the steps described above are generally performed in reverse.

Starting from the ground configuration, when the actuator 27 retracts from fully extended, the finger 37 on the end of the actuator arm 27 slides in the slot 35 of the locus control arm 33. No significant motion is imparted to the outer region as the connecting link 27' merely pivots about the end attached to the bellcrank 21. However, as the finger 37 slides in the slot 35, a second finger 51 (protruding from the other side of the actuator arm 27) contacts a protrusion on the outboard lock link 49, forcing the lock links 49 to break their overcentre condition, which in turn pulls the locking arms 47 out of straight line alignment thus breaking the geometric lock. When the finger 37 reaches the end of the slot 35, the locus control arm ensures that further retraction of the actuator 27 pulls the outer region down, forcing the locking arms 47 and lock links 49 to fold back into their original position.

When the outer region has swung down all the way, the half-cylinder features 40' and 42' no longer prevent axial translation, and further retraction of the actuator 27 rotates the bellcrank 21 causing the outer region to be dragged aft. This action re-engages the connectors until the forward link 19 and bellcrank 21 once again form a geometric lock.

In the above-description the actuator 27 effects movement between all three configurations. In the event that the actuator is removed or disabled, and the outer region needs to be moved, it can be manually moved by manually breaking the geometric lock (i.e. overcoming the holding spring force) and moving the outer region to the desired position. The locking arms will automatically engage when the desired position is reached.

As will be appreciated from the description of the first embodiment of the invention, the present invention provides a fail-safe arrangement for a folding wing. Furthermore since the same actuator 27 can be used to both unlock the outer region from the inner region (i.e. effect movement to the intermediate configuration) and swing the outer region upwards (i.e. effect movement to the ground configuration), the arrangement is relatively simple.

Figure 9:
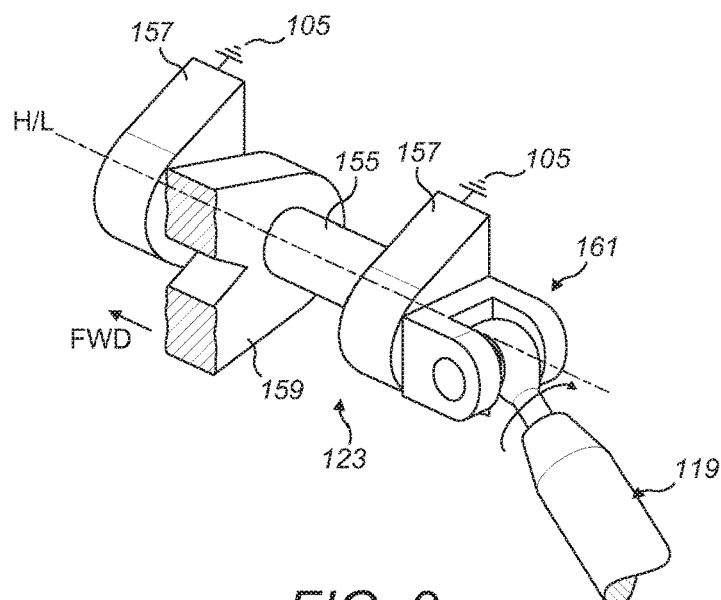
FIG. 9 is a perspective view of part of a second embodiment of the invention.
Figure 10:
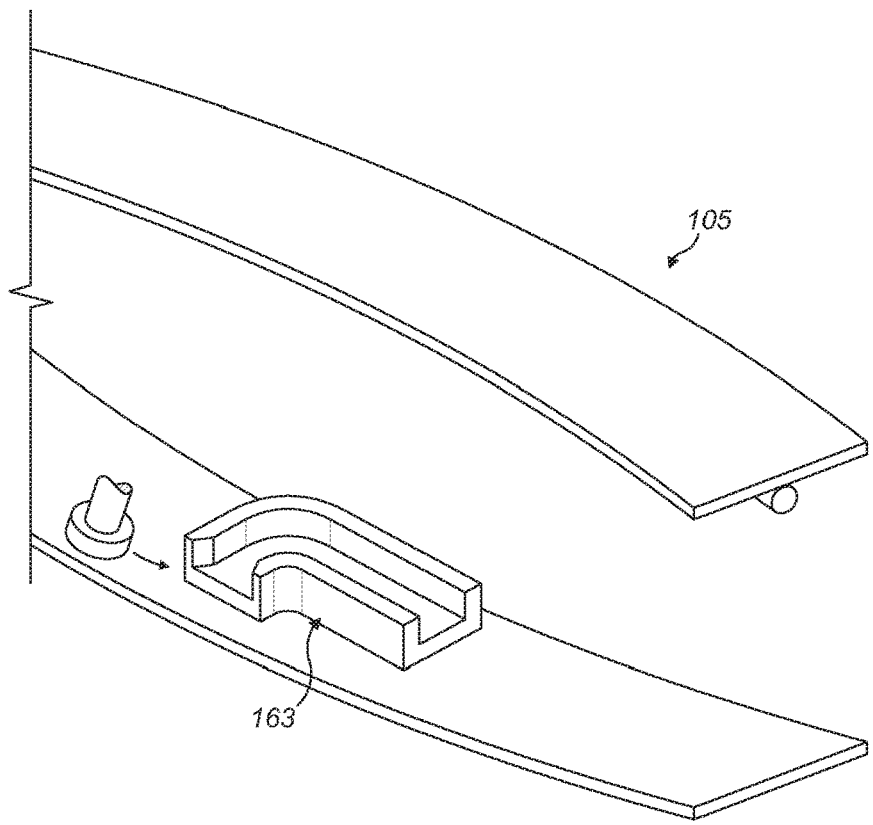
FIG. 10 is a perspective view of another part of the second embodiment of the invention.

FIGS. 9 and 10 show parts of a second embodiment of the invention. The second embodiment is substantially the same as the first except for the differences shown in these figures. Features in the second embodiment of the invention that correspond to similar features in the first embodiment of the invention, are shown with the same reference numerals as in the first embodiment, but with the addition of the prefix '1' (or '10' where appropriate).

FIG. 9 shows an alternative connection 123 between the rigid link 119 and the inner region 105 of the wing. Instead of being a fixed bracket 23 to which the link 19 is attached (see first embodiment in FIG. 2a) the connection 123 of the second embodiment is a second hinge between the inner and outer regions of the wing. The hinge comprises a pin 155 extending between two support lugs 157 which are fixed to the inner region 105 of the wing. This pin 155 passes through a further lug 159 attached to the outer region 103 (not shown). The lug 159 is not only rotatable about the pin 155, but it is also free to slide along it. Since the pin is aligned with the first direction, as the outer region moves from the flight configuration to the intermediate configuration, the necessary translational movement is accommodated by the hinge (FIG. 9 shows the lug 159 when the outer region is in the intermediate configuration, and thus has already been displaced forwards). The link 119 is connected to the rear-most support lug 157 about a Cardan joint 161 to allow for the movement between the end of the link 119, and the lug 157, as the outer region is rotated to/from the ground configuration.

FIG. 10 shows a guidance track 163 located on the inside surface of the lower wing skin, of the inner region of the wing. The track 163 comprises a straight section 163', and a mouth 163" orientated substantially perpendicular thereto. FIG. 10 shows the outer region after it has left the ground configuration, and just before it reaches the intermediate configuration; in the intermediate configuration, a roller 165 attached to the outer region 103 (not shown), moves into the mouth 163" and into the end of the straight section 163'. Further movement (from the intermediate configuration to the flight configuration) moves the roller 165 along the straight section 163' to the other end of the track. By having such a track and roller arrangement to guide the movement of the outer region, the tolerances in the first hinge (particularly the half-cylindrical protrusions, see FIG. 5) need not be quite so precise.

It will be appreciated that in the above-mentioned Figures, various features have been omitted from different views; in most of the Figures only the features described are shown and the other parts of the aircraft are omitted for the sake of clarity.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft comprising a foldable aerodynamic structure, the aerodynamic structure comprising an inner region and an outer region, the outer region being moveable relative to the inner region between:
   a) a flight configuration for use during flight,
   b) an intermediate configuration, and
   c) a ground configuration for use during ground-based operations,
wherein
in the flight configuration the inner and outer regions are locked together via a multiplicity of connectors, the connectors being arranged to transfer loads from the outer region to the inner region;
in the intermediate configuration the outer region is displaced in a first direction, relative to the inner region, the displacement being such that the connection by the multiplicity of connectors is disengaged and being such that the outer region is unlocked from the inner region, and in the intermediate configuration the outer region is also connected to the inner region via a hinge about which the outer region may rotate, and
in the ground configuration, the outer region is rotated about the hinge, such that the span of the aerodynamic structure is reduced,
wherein each connector comprises a pin associated with the inner or outer region, and a socket associated with the corresponding other, outer or inner, region, the pin being engaged in the socket when the outer region is in the flight configuration, and
wherein the pin and the socket of each connector is aligned with the first direction to allow movement of the outer region between the flight and intermediate configurations, but the multiplicity of connectors are located off a hinge line such that, in the flight configuration, they prevent relative rotation between the inner and outer regions.

2. An aircraft according to claim 1, further comprising an actuator, the actuator being arranged to effect the movement of the outer region between the flight configuration and the intermediate configuration.

3. An aircraft according to claim 2, wherein the actuator is also arranged to effect movement of the outer region between the intermediate configuration and the ground configuration.

4. An aircraft according to claim 1, wherein the first direction is forwards, in a generally chordwise direction.

5. An aircraft according to claim 1, wherein in the flight configuration the outer region is also connected to the inner region via a further connector arranged to transfer loads from the outer region to the inner region, and wherein the further connector is arranged such that when the outer region is displaced forwardly in a chordwise direction, relative to the inner region, the further connector becomes the hinge.

6. An aircraft according to claim 1 comprising an articulation mechanism operable to effect movement of the outer region between the flight, intermediate and ground configurations.

7. An aircraft according to claim 6, wherein the articulation mechanism comprises a link and a pivotable crank, the link being connected at its first end to the crank, and being connected at its second end to either the inner or the outer region, and the crank being pivotably connected to the other of the outer and inner regions.

8. An aircraft according to claim 7, wherein in the flight configuration, the connections between the inner/outer region and link, the link and crank, and the crank and outer/inner region, are all substantially in line, thereby forming a geometric lock.

9. An aircraft according to claim 8, further comprising an actuator, the actuator being arranged to effect the movement of the outer region between the flight configuration and the intermediate configuration, wherein the actuator is arranged to effect rotation of the crank to make and break the geometric lock.

10. An aircraft according to claim 7, wherein the articulation mechanism is arranged such that rotation of the crank through a first angular displacement from its location in the flight configuration, displaces the outer region in the first direction such that the outer region is in the intermediate configuration.

11. An aircraft according to claim 10, wherein after rotation by the first angular displacement, the crank is prevented from further rotational movement by a stop thereby preventing further displacement of the outer region in the first direction.

12. An aircraft according to claim 11, wherein the first end of the link is located on the hinge line such that further actuation of the crank results in rotation about said hinge line.

13. An aircraft according to claim 1, further comprising a pair of locking arms, the aircraft being arranged such that in the flight configuration the locking arms are stowed, and in the ground configuration the locking arms are deployed such that they form a locking brace to lock the outer region in the ground configuration.

14. An aircraft according to claim 13, wherein the locking arms are pivotably connected together at one end and the locking arms are pivotably connected at their respective other ends to the inner and outer regions respectively, and the aircraft is arranged such that in the flight configuration the pair of locking arms are folded together, and in the ground configuration the locking arms are unfolded such that the arms form the locking brace.

15. An aircraft according to claim 1, wherein the aerodynamic structure is an aircraft wing, and the outer region is a wing tip device.

16. A foldable aerodynamic structure for use as the foldable aerodynamic structure of claim 1.

17. An articulation mechanism for use as the articulation mechanism according to claim 6.

18. A method of folding an aerodynamic structure on an aircraft from a flight configuration to a ground configuration, in which flight configuration an inner region of the aerodynamic structure and an outer region of the aerodynamic structure are locked together via a multiplicity of connectors, the connectors being arranged to transfer loads from the outer region to the inner region wherein the method comprises the steps of displacing the outer region of the structure in a first direction, relative to the inner region, such that the connection by the multiplicity of connectors is disengaged thereby unlocking the outer region from the inner region, and subsequently rotating the outer region about a hinge such that the span of the aerodynamic structure is reduced, wherein each connector comprises a pin associated with the inner or outer region, and a socket associated with the corresponding other, outer or inner, region, the pin being engaged in the socket when the outer region is in the flight configuration, and wherein the pin and the socket of each connector is aligned with the first direction to allow movement of the outer region between the flight and intermediate configurations, but the multiplicity of connectors are located off a hinge line such that, in the flight configuration, they prevent relative rotation between the inner and outer regions.

19. A method according to claim 18, wherein the step of displacing the outer region in the first direction is effected by an actuator, and the step of rotating the outer region about the hinge is effected by the same actuator.

\* \* \* \* \*